(12) United States Patent
Nagaraj et al.

(10) Patent No.: US 6,283,715 B1
(45) Date of Patent: Sep. 4, 2001

(54) COATED TURBINE COMPONENT AND ITS FABRICATION

(75) Inventors: Bangalore A. Nagaraj, West Chester; Norbert O. Maurer, Loveland; Eric A. Estill, Morrow; Elissa H. Lee, Cincinnati, all of OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/405,479

(22) Filed: Sep. 24, 1999

Related U.S. Application Data

(63) Continuation-in-part of application No. 09/373,270, filed on Aug. 11, 1999.

(51) Int. Cl.[7] .................................................. F01D 5/14
(52) U.S. Cl. ................................. 416/241 R; 416/241 B
(58) Field of Search ...................... 416/229 R, 229 A, 416/241 R, 241 B; 427/405, 419.7, 230, 239; 428/610, 632, 633, 667, 652, 678, 670; 148/281, 240

(56) References Cited

U.S. PATENT DOCUMENTS

| | | | |
|---|---|---|---|
| 4,148,936 | * 4/1979 | Grisik et al. ........................... 427/253 |
| 5,674,610 | * 10/1997 | Schaeffer et al. ..................... 428/344 |
| 6,066,405 | * 5/2000 | Schaeffer .............................. 428/547 |
| 6,071,556 | * 6/2000 | Beele .................................. 427/126.3 |
| 6,103,386 | * 8/2000 | Raybould et al. ................... 428/472 |

* cited by examiner

*Primary Examiner*—F. Daniel Lopez
*Assistant Examiner*—Ninh Nguyen
(74) *Attorney, Agent, or Firm*—Andrew C. Hess; David L. Narcisco

(57) ABSTRACT

A gas turbine component has a platform, a shank extending downwardly from the platform, and an airfoil extending upwardly from the platform. The gas turbine component is coated by first applying a first chromide layer overlying the base metal of at least a portion of the shank and interdiffused therewith, and second applying a second coating on at least a portion of the airfoil. The second coating optionally includes a second chromide layer contacting the base metal of the airfoil and interdiffused therewith, and includes an aluminide protective layer overlying the second chromide layer. The first chromide layer on the shank and the second chromide layer on the airfoil may be within the same chromium composition range (for example, from about 20 to about 30 weight percent chromium) and thickness range (for example, from about 0.001 to about 0.002 inch), and deposited at the same time.

20 Claims, 2 Drawing Sheets

COATED TURBINE COMPONENT AND ITS FABRICATION

This application is a continuation-in-part of application Ser. No. 09/373,270, filed Aug. 11, 1999, for which priority is claimed.

FIELD OF THE INVENTION

This invention relates to aircraft gas turbine engines, and, more particularly, to protective coatings placed on turbine components such as turbine blades and turbine vanes.

BACKGROUND OF THE INVENTION

In an aircraft gas turbine (jet) engine, air is drawn into the front of the engine, compressed by a shaft-mounted compressor, and mixed with fuel. The mixture is burned, and the hot exhaust gases are passed through a turbine mounted on the same shaft. The flow of combustion gas turns the turbine by impingement against an airfoil section of the turbine blades and vanes, which turns the shaft and provides power to the compressor and fan. The hot exhaust gases flow from the back of the engine, driving it and the aircraft forwardly.

The hotter the combustion and exhaust gases, the more efficient is the operation of the jet engine. There is thus an incentive to raise the combustion and exhaust gas temperatures. The maximum temperature of the combustion gases is normally limited by the materials used to fabricate the turbine vanes and turbine blades of the turbine, upon which the hot combustion gases impinge. In current engines, the turbine vanes and blades are made of nickel-based superalloys, and can operate at temperatures of up to about 1900–2100° F.

Many approaches have been used to increase the operating temperature limit of the turbine blades and vanes to their current levels. For example, the composition and processing of the base materials themselves have been improved.

Physical cooling techniques may also be used. In one technique, internal cooling passages through the interior of the turbine airfoil are present. Air is forced through the cooling passages and out openings at the external surface of the airfoil, removing heat from the interior of the airfoil and, in some cases, providing a boundary layer of cooler air at the surface of the airfoil. In another approach, a protective layer or a metal/ceramic thermal barrier coating (TBC) system is applied to the airfoil, which acts as a substrate.

The gas turbine blade or vane is operated in a highly aggressive environment that can cause damage to the component in service. The environmental damage may be in various forms, such as particle erosion, different types of corrosion, and oxidation, and complex combinations of these damage modes, in the hot combustion gas environment. The rate of environmental damage may be lessened somewhat with the use of the protective layers. However, the various types of environmental damage are still observed, often necessitating premature replacement or repair of components after service exposure.

There is a need for an improved approach to the protection of gas turbine components such as turbine blades and vanes. The present invention fulfills this need, and further provides related advantages.

BRIEF SUMMARY OF THE INVENTION

The present invention provides a coated gas turbine component and a method for its preparation. The coating achieves protection of the component in regions usually subject in service to intermediate-temperature corrosion. The technique of the invention is fully compatible with other coating procedures, such as the application of a thermal barrier coating.

A coated gas turbine component comprises a gas turbine component formed of a base metal. The gas turbine component includes a platform, a shank extending downwardly from the platform, and an airfoil extending upwardly from the platform. A first coating contacts the base metal of at least a portion of the shank and is interdiffused therewith. The first coating comprises a first chromide layer. A second coating contacts at least a portion of the airfoil. The second coating comprises a protective layer that is a diffusion coating or an overlay coating.

Preferably but not necessarily, a second chromide layer is disposed between the base metal of the airfoil and the protective layer, and is interdiffused with the base metal of the airfoil. Where there is no second chromide layer, the protective layer of the second coating directly contacts the base metal of the airfoil. A ceramic layer may overlie the protective layer of the second coating.

The base metal is preferably a nickel-base superalloy, and may be of any operable type and composition. The first chromide layer preferably comprises from about 20 to about 30 weight percent chromium, and is from about 0.001 to about 0.002 inch thick. The second chromide layer, where present, also preferably comprises from about 20 to about 30 weight percent chromium, and is from about 0.001 to about 0.002 inch thick. The first and second chromide layers further optionally include chromide-modifying elements such as silicon deposited with the chromium in forming the chromide layer, elements interdiffused with the chromide layer from the base metal, and impurities. Where the chromide layer lies between the base metal and a diffusion coating, the chromide layer further includes elements interdiffused from the diffusion coating. The diffusion coating of the second coating preferably is a diffusion aluminide or a diffusion platinum aluminide, while the overlay coating is preferably an MCrAlX coating. In addition to the regions coated as discussed above, the first coating may be applied to the bottom side of the platform and some portions of the dovetail, and the second coating may be applied to the top side of the platform.

A method for preparing a coated gas turbine component comprising a base metal includes the steps of furnishing a gas turbine component comprising a platform, a shank extending downwardly from the platform, and an airfoil extending upwardly from the platform, and first applying a first coating overlying the base metal of at least a portion of the shank and interdiffused therewith. The first coating comprises a first chromide layer. The method further includes second applying a second coating overlying at least a portion of the airfoil. The second coating comprises a protective layer selected from the group consisting of a diffusion coating and an overlay coating. Optionally, the step of second applying includes steps of depositing a second chromide layer overlying the base metal of the airfoil, and depositing the protective layer overlying the second chromide layer. Where no second chromide layer is used, the protective layer is deposited directly overlying and contacting the base metal of the airfoil.

The first chromide layer is formed by depositing chromium overlying the base metal of the shank, and interdiffusing the chromium with the base metal. The second chromide layer, where present, is deposited by depositing chromium overlying the base metal of the airfoil, and interdiffusing the chromium with the base metal. In either case, the chromide preferably comprises about 20 to about 30 weight percent chromium. Where both first and second chromide layers are present, they are preferably deposited concurrently. After diffusion, the two chromide coatings may have substantially the same composition, or they may have different compositions. The step of second applying may optionally include applying a ceramic thermal barrier coating overlying the protective layer of the second coating.

The present approach results in a chromide coating on the shank, and optionally the underside of the platform and portions of the dovetail. The chromide coating protects the shank against intermediate-temperature corrosion in the range of about 1100° F.–1500° F., the operating temperature of the shank in most service environments. The airfoil is optionally coated with chromide coating, and then further coated with the protective layer, for enhanced corrosion resistance. All or portions of the airfoil that are subjected to the highest temperatures, such as the concave high-pressure side, may be further coated with the ceramic thermal barrier coating.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
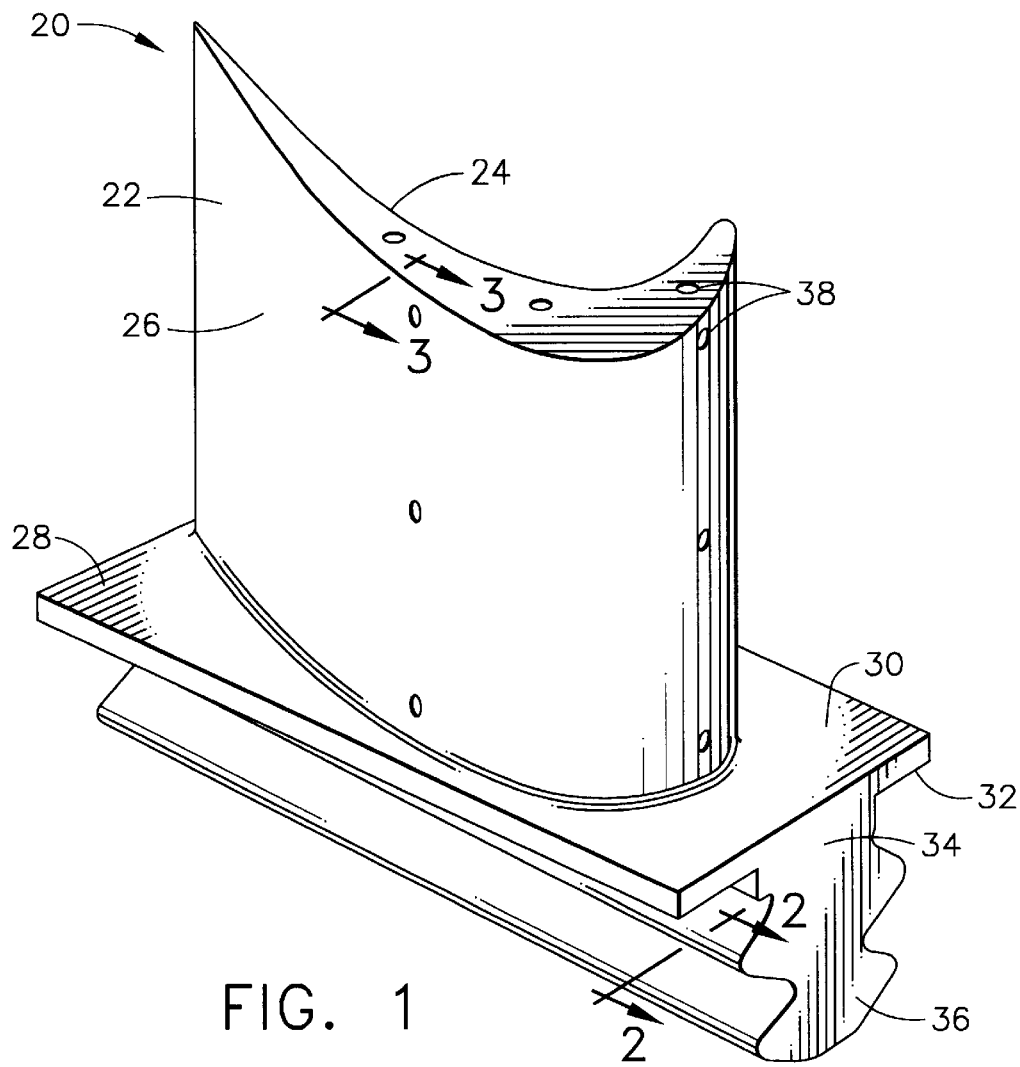
FIG. 1 is a perspective view of a turbine blade.

FIG. 1 depicts a component article of a gas turbine engine such as a turbine blade or turbine vane, and in this illustration a turbine blade 20. (The turbine vane has a similar appearance in respect to the pertinent portions.) The turbine blade 20 is formed of any operable material, preferably a nickel-base superalloy, which is the base metal of the turbine blade 20. The base metal of the turbine blade serves as a substrate 21 (FIGS. 2 and 3) for the coatings that are described subsequently. The turbine blade 20 includes an airfoil 22 against which the flow of hot exhaust gas is directed. The airfoil 22 may be described as having a high-pressure side 24, which is concavely shaped; and a suction side 26, which is convexly shaped and is sometimes known as the "low-pressure side" or "back side". In service, the hot combustion gas is directed against the high-pressure side 24.

The airfoil 22 extends upwardly from a platform 28, which extends laterally outwardly from the airfoil 22. The platform 28 has a top side 30 adjacent to the airfoil 22 and a bottom side 32 remote from the airfoil 22. A shank 34 extends downwardly (in the opposite direction to that of the airfoil 22) from the platform 28. The turbine blade 20 is mounted to a turbine disk (not shown) by a dovetail 36 which extends downwardly from the shank 34 and engages a slot on the turbine disk.

In some embodiments, a number of internal passages extend through the interior of the airfoil 22, ending in openings 38 in the surface of the airfoil 22. During service, a flow of cooling air is directed through the internal passages, to reduce the temperature of the airfoil 22.

Figure 2:
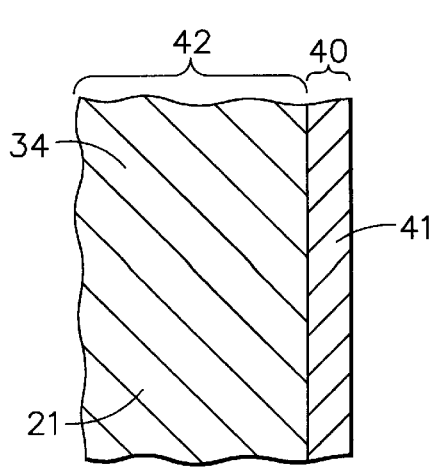
FIG. 2 is an enlarged schematic sectional view through the shank portion of the turbine blade of FIG. 1, taken on line 2—2.
Figure 3:
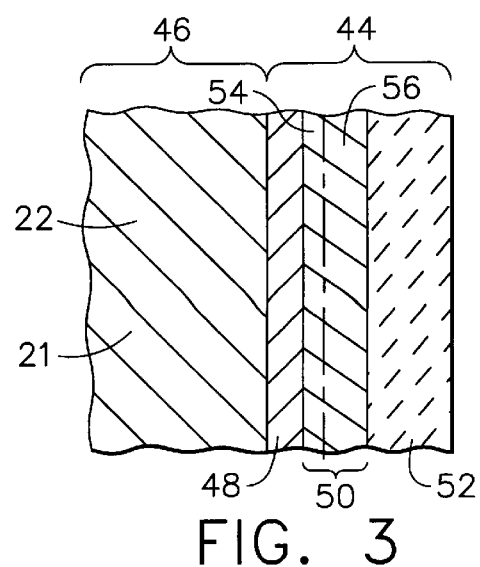
FIG. 3 is an enlarged schematic sectional view through the airfoil portion of the turbine blade of FIG. 1, taken on line 3—3.

The present approach provides for the application of different types of coatings in different regions of the turbine blade 20. FIGS. 2 and 3, which are not drawn to scale, illustrate these coatings as applied to the base-metal substrate 21 of the shank 34 (FIG. 2) and the airfoil 22 (FIG. 3). Referring to FIG. 2, a first coating 40 is applied to and contacts a substrate base metal 42 of at least a portion of the shank 34. The first coating 40 is at least partially interdiffused with the base metal 42 of the shank 34. The first coating 40 comprises a first chromide layer 41, which is coincident with the first coating 40, and forms the entire first coating 40, in the preferred form illustrated in FIG. 2. The first chromide layer 41 may be any operable chromide composition, and is preferably an average composition of from about 20 to about 30 weight percent chromium, balance interdiffused elements of the base metal, and impurities. (The term "chromide" does not suggest a particular composition such as an intermetallic composition, and instead indicates an elevated chromium composition.) Other modifying elements such as silicon may be co-deposited with the chromium, and become part of the first chromide layer 41. The first chromide layer 41 is preferably from about 0.001 to about 0.002 inch thick. The first coating 40 may optionally be applied to a portion of the bottom side 32 of the platform 28, and/or a portion of the dovetail 36.

Referring to FIG. 3, a second coating 44 is applied to and contacts a substrate base metal 46 of at least a portion of the airfoil 22. The substrate base metal 46 of the airfoil 22 is usually of the same composition as the substrate base metal 42 of the shank 34, because the entire turbine blade 20 is typically cast as an integral piece of a single composition of metal. Optionally, the second coating 44 may also be applied to a portion of the top side 30 of the platform 28.

The second coating 44 comprises an optional-but-preferred second chromide layer 48 overlying and contacting the substrate base metal 46 of the airfoil 22. The second chromide layer 48 is at least partially interdiffused with the base metal 46 of the airfoil 22. The second chromide layer 48 may be any operable chromide material or composition, and preferably comprises an average composition of from about 20 to about 30 weight percent chromium, balance interdiffused elements of the base metal, and impurities. Other modifying elements such as silicon may be co-deposited with the chromium, and become part of the first chromide layer 41. The second chromide layer 48 is preferably from about 0.001 to about 0.002 inch thick. It is preferred that the second chromide layer 48 be of substantially the same composition and thickness as the first chromide layer 41 applied to the shank 34, and that the first chromide layer 41 and the second chromide layer 48 be applied to the substrate 21 at the same time and using the same technique, as will be discussed in more detail subsequently.

The second coating 44 comprises a protective layer 50. Where there is no second chromide layer 48, the protective layer 50 directly contacts the substrate base metal 46 of the airfoil 22. Where the second chromide layer 48 is present, the protective layer 50 overlies and contacts the second chromide layer 48 of the second coating 44. The protective layer 50 preferably comprises either a diffusion aluminide or a diffusion platinum aluminide. The preferred diffusion aluminide protective layer 50 preferably comprises aluminum modified by the addition of the following elements to improve corrosion resistance: chromium, hafnium, silicon, zirconium, yttrium, platinum, and palladium, and combinations thereof. The modifying element is present in an effective amount. Typical amounts of the modifying elements that are present, either alone or in combination in compatible compositions, include, in weight percent, from about 2 to about 50 percent chromium, from about 0.1 to about 20 percent hafnium, from about 0.1 to about 10 percent silicon, from about 0.1 to about 5 percent zirconium, from about 0.1 to about 5 percent yttrium, from about 0.1 to about 50 percent palladium, and from about 0.1 to about 50 percent platinum (in which case the protective layer 50 is termed a platinum aluminide). The aluminum and the corrosion-improving modifying element are at least partially interdiffused with the substrate base metal 46 and the second chromide layer 48 (where present), rather than being present as an overlay coating. The protective layer 50 is preferably from about 0.0005 inch to about 0.005 inch thick.

The protective layer 50 may instead be an MCrAlX overlay protective layer, although this type of protective layer is not preferred. The terminology "MCrAlX" is a shorthand term of art for a variety of families of overlay protective layers that may be employed as environmental coatings or bond coats in thermal barrier coating systems. In this and other forms, M refers to nickel, cobalt, iron, and combinations thereof. In some of these protective coatings, the chromium may be omitted. The X denotes elements such as hafnium, zirconium, yttrium, tantalum, rhenium, platinum, silicon, titanium, boron, carbon, and combinations thereof. Specific compositions are known in the art. Some examples of MCrAlX compositions include, for example, NiAlCrZr and NiAlZr, but this listing of examples is not to be taken as limiting. The MCrAlX protective layer may interdiffuse with the substrate base metal 46 and/or the second chromide layer 48, but any such interdiffusion is relatively slight so that the MCrAlX protective layer remains discrete.

Optionally, the second coating 44 may further comprise a ceramic layer 52 overlying and contacting the protective layer 50. The ceramic layer 52 is a ceramic material that serves as a thermal barrier coating to insulate the underlying layers. The ceramic layer 52 is usually applied only in those regions of the airfoil 22 that are subjected to the highest temperatures. For example, the second coating 44 as applied to the suction side 26 may not require the use of the ceramic layer 52, while the second coating 44 as applied to the high-pressure side 24 may include the ceramic layer 52. The ceramic layer 52 is preferably yttria-stabilized zirconia, which is zirconium oxide containing from about 2 to about 12 weight percent, preferably from about 3 to about 8 weight percent, of yttrium oxide. The ceramic layer 52 is typically from about 0.003 to about 0.010 inch thick. Other operable ceramic materials and thicknesses may be used as well. When there is no ceramic layer 52 present, the second coating 44 is termed an "environmental coating". When there is a ceramic layer 52 present, the second coating 44 is termed a "thermal barrier coating system", and the layers 48 and 50 serve as the "bond coat" for the ceramic layer 52.

Figure 4:
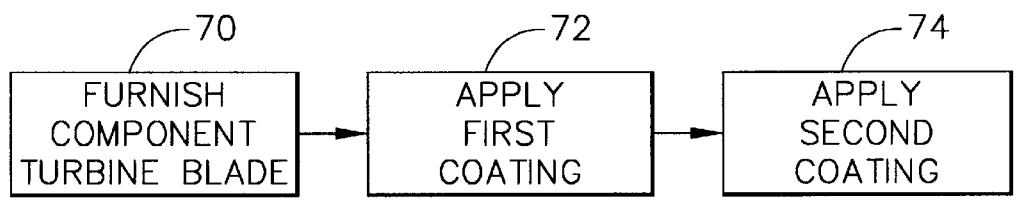
FIG. 4 is a block flow diagram of a first embodiment of an approach for preparing a coated gas turbine component.

FIG. 4 depicts in block diagram form a first embodiment of a method for preparing a coating turbine component. A turbine component is provided, numeral 70. The turbine component is preferably the turbine blade 20 of FIG. 1. The turbine component is typically cast to the desired shape, as in the case of the turbine blade 20. The furnished turbine component is in a clean state, or may be cleaned of surface residue, casting defects, and the like in this step 70, using standard procedures. The turbine component may be made of any operable material, with a nickel-base superalloy being preferred. As used herein, "nickel-base" means that the composition has more nickel present than any other element. The nickel-base superalloys are typically of a composition that is strengthened by the precipitation of gamma-prime phase. The preferred nickel-base alloy has a composition, in weight percent, of from about 4 to about 20 percent cobalt, from about 1 to about 10 percent chromium, from about 5 to about 7 percent aluminum, from 0 to about 2 percent molybdenum, from about 3 to about 8 percent tungsten, from about 4 to about 12 percent tantalum, from 0 to about 2 percent titanium, from 0 to about 8 percent rhenium, from 0 to about 6 percent ruthenium, from 0 to about 1 percent niobium, from 0 to about 0.1 percent carbon, from 0 to about 0.01 percent boron, from 0 to about 0.1 percent yttrium, from 0 to about 1.5 percent hafnium, balance nickel and incidental impurities.

A most preferred alloy composition is Rene' N5, which has a nominal composition in weight percent of about 7.5 percent cobalt, about 7 percent chromium, about 6.2 percent aluminum, about 6.5 percent tantalum, about 5 percent tungsten, about 1.5 percent molybdenum, about 3 percent rhenium, about 0.05 percent carbon, about 0.004 percent boron, about 0.15 percent hafnium, up to about 0.01 percent yttrium, balance nickel and incidental impurities. Other operable superalloys include, for example, Rene' N6, which has a nominal composition in weight percent of about 12.5 percent cobalt, about 4.2 percent chromium, about 1.4 percent molybdenum, about 5.75 percent tungsten, about 5.4 percent rhenium, about 7.2 percent tantalum, about 5.75 percent aluminum, about 0.15 percent hafnium, about 0.05 percent carbon, about 0.004 percent boron, about 0.01 percent yttrium, balance nickel and incidental impurities; Rene' 142, which has a nominal composition in weight percent of about 6.8 percent chromium, about 12.0 percent cobalt, about 1.5 percent molybdenum, about 2.8 percent rhenium, about 1.5 percent hafnium, about 6.15 percent aluminum, about 4.9 percent tungsten, about 6.35 percent tantalum, about 150 parts per million boron. about 0.12 percent carbon, balance nickel and incidental impurities; CMSX-4, which has a nominal composition in weight percent of about 9.60 percent cobalt, about 6.6 percent chromium, about 0.60 percent molybdenum, about 6.4 percent tungsten, about 3.0 percent rhenium, about 6.5 percent tantalum, about 5.6 percent aluminum, about 1.0 percent titanium, about 0.10 percent hafnium, balance nickel and incidental impurities; CMSX-10, which has a nominal composition in weight percent of about 7.00 percent cobalt, about 2.65percent chromium, about 0.60 percent molybdenum, about 6.40 percent tungsten, about 5.50 percent rhenium, about 7.5 percent tantalum, about 5.80 percent aluminum, about 0.80 percent titanium, about 0.06 percent hafnium, about 0.4 percent niobium, balance nickel and incidental impurities; PWA1480, which has a nominal composition in weight percent of about 5.00 percent cobalt, about 10.0 percent chromium, about 4.00 percent tungsten, about 12.0 percent tantalum, about 5.00 percent aluminum, about 1.5 percent titanium, balance nickel and incidental impurities; PWA1484, which has a nominal composition in weight percent of about 10.00 percent cobalt, about 5.00 percent chromium, about 2.00 percent molybdenum, about 6.00 percent tungsten, about 3.00 percent rhenium, about 8.70 percent tantalum, about 5.60 percent aluminum, about 0.10 percent hafnium, balance nickel and incidental impurities; and MX-4, which has a nominal composition as set forth in U.S. Pat. No. 5,482,789, in weight percent, of from about 0.4 to about 6.5 percent ruthenium, from about 4.5 to about 5.75 percent rhenium, from about 5.8 to about 10.7 percent tantalum, from about 4.25 to about 17.0 percent cobalt, from 0 to about 0.05 percent hafnium, from 0 to about 0.06 percent carbon, from 0 to about 0.01 percent boron, from 0 to about 0.02 percent yttrium, from about 0.9 to about 2.0 percent molybdenum, from about 1.25 to about 6.0 percent chromium, from 0 to about 1.0 percent niobium, from about 5.0 to about 6.6 percent aluminum, from 0 to about 1.0 percent titanium, from about 3.0 to about 7.5 percent tungsten, and wherein the sum of molybdenum plus chromium plus niobium is from about 2.15 to about 9.0 percent, and wherein the sum of aluminum plus titanium plus tungsten is from about 8.0 to about 15.1 percent, balance nickel and incidental impurities. The use of the present invention is not limited to turbine components made of these preferred alloys, and has broader applicability.

The coatings 40 and 44 are applied in their respective locations as discussed previously. Specifically, the first coating 40 is applied, numeral 72, to the shank 34, and the second coating 44 is applied, numeral 74, to the airfoil 22. The steps 72 and 74 may be performed sequentially, or partially simultaneously and partially sequentially.

Figure 5:
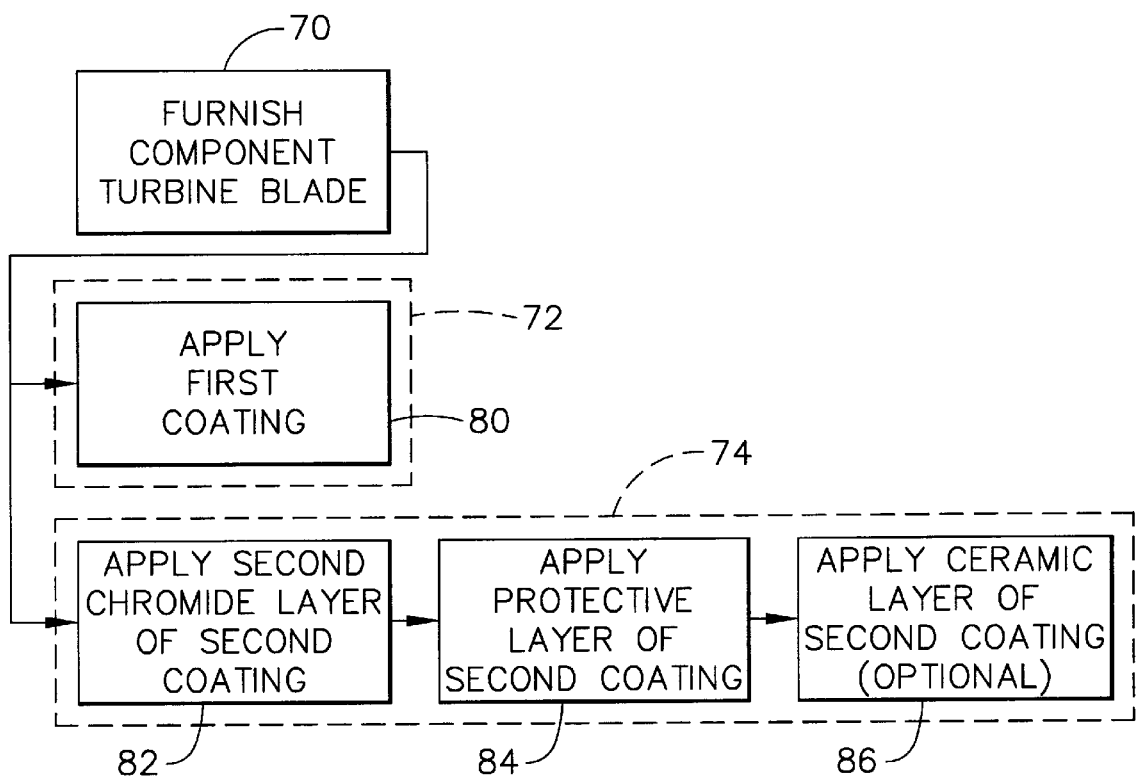
FIG. 5 is a block flow diagram of a second embodiment of an approach for preparing a coated gas turbine component.

FIG. 5 depicts in greater detail the manner in which the steps 72 and 74 are performed in a preferred approach, wherein the steps 72 and 74 are performed partially simultaneously and partially sequentially. In FIG. 5, the step 70 is the same as that in FIG. 4, and the preceding description is incorporated here.

The first coating 40 is applied, numeral 80. The step of application 80 of the first coating 40 has been assigned a different number in FIG. 5 than the overall application step 72, because the step 72 may include additional procedures such as machining or cleaning after the step 80 is complete. In this preferred approach which includes the application of the second chromide layer 48, the second chromide layer 48 of the second coating 44 is applied simultaneously in step 82 with the application of the first chromide layer 41 in step 80. Any portions of the turbine blade 20 which are not to be coated with the chromide coating, such as portions of the dovetail 36, are masked using conventional masking techniques to prevent coating thereon. The steps 80 and 82 are therefore preferably accomplished simultaneously by any operable process, most preferably by vapor deposition. In this approach, a hydrogen halide gas, such as hydrogen chloride, is contacted with chromium metal or a chromium alloy to form the corresponding chromium halide gas. Chromide-modifying elements such as, but not limited to, silicon may optionally be doped from similar sources into the gaseous source. The source gas is contacted to the portions of the turbine blade which are to be protected by the first coating 40 and by the second coating 44. The temperature of the base metal during this contacting is from about 1800° F. to about 1900° F. Other deposition techniques such as chemical vapor deposition may also be used. During the steps 80 and 82, which are conducted at elevated temperature, there is an interdiffusion of the deposited chromium into the base metal 42 and 46. If desired, additional diffusion may be accomplished by extending the period during which the turbine blade 20 is exposed to elevated temperature, but without deposition of additional chromium. The result of the deposition of chromium and simultaneous and/or subsequent interdiffusion is the first chromide layer 41 of the first coating 40 and the second chromide layer 48 of the second coating 44, each about 0.001 to about 0.002 inch thick and having a composition of an average of from about 20 to about 30 weight percent chromium, the chromide-modifying elements, if any, and balance the elements of the base metal and impurities. With this technique, the first chromide layer 41 and the second chromide layer 48 are deposited and interdiffused with the base metal in from about ½ to about 4 hours, most preferably about 2 hours.

This completes the application of the first coating 40, except for any post-application steps such as machining or cleaning. The shank 34 and any other regions which are not to be coated with the additional layers of the second coating 44 may be protected from further deposition by masking or any other technique.

The protective layer 50 of the second coating 44 is applied, numeral 84. The protective layer 50 is preferably a diffusion aluminide or a diffusion platinum aluminide, optionally modified by the presence of alloying elements. In the case of a diffusion aluminide, the source of aluminum is preferably a gaseous source, as in vapor phase aluminiding. In this approach, a hydrogen halide gas, such as hydrogen chloride, is contacted with aluminum metal or an aluminum alloy to form the corresponding aluminum halide gas. Aluminide-modifying elements, such as hafnium, zirconium, yttrium, silicon, titanium, tantalum, cobalt, chromium, platinum, and palladium, may optionally be doped from similar sources into the gaseous source. The source gas is contacted to the portions of the turbine blade which are to be protected by the protective layer 50 of the second coating 44. This may include the surfaces already coated with the optional second chromide layer 48, as well as the internal passages of the turbine blade. Aluminum, with any optional dopants included, is deposited onto the contacted surface. The deposition reaction typically occurs at elevated temperature such as from about 1800° F. to about 2100° F. so that deposited aluminum atoms interdiffuse into the base metal and the second chromide layer 48, where present. (The chromium atoms of the first chromide layer 42 and the second chromide layer 48 also continue to interdiffuse with the base metal during this elevated-temperature operation.) An aluminum coating about 0.002 inch thick may be deposited in about 4–8 hours using this approach. Other known and operable aluminum-deposition techniques such as pack cementation, above-the-pack aluminiding, slurry deposition, chemical vapor deposition (CVD), and organo-metallic chemical vapor deposition may also be used.

If the coating is to be a diffusion platinum aluminide, a sublayer 54 of platinum may be deposited onto the second chromide layer 48, before the sublayer 56 of aluminum is deposited over the sublayer 54 of platinum. The combination of the second chromide sublayer 48 and a platinum-aluminide protective layer 50 gives particularly good corrosion resistance in the service temperature range of operation. The deposition of the sublayer 54 of platinum is accomplished by depositing platinum from solution onto the base metal substrate 46 (or second chromide layer 48, if present. An operable platinum-containing aqueous solution is $Pt(NH_3)_4HPO_4$ having a concentration of about 4–20 grams per liter of platinum, and a voltage/current source is operated at about ½–10 amperes per square foot of facing article surface. The platinum sublayer 54 about 5 micrometers thick is deposited in 1–4 hours at a temperature of 190–200° F. The aluminum sublayer 56 is thereafter deposited overlying the platinum sublayer 54, using the aluminum deposition approach described above. A significant amount of interdiffusion of the platinum sublayer 54, the aluminum sublayer 56, and the substrate base metal 46 is achieved during the aluminum deposition. Additional interdiffusion may be accomplished if desired by maintaining the structure at elevated temperature after the flow of halide gas is discontinued.

The ceramic layer 52 is optionally deposited overlying the protective layer 50 of the second coating 44, numeral 86 of FIG. 5. The ceramic layer 52 is preferably from about 0.003 to about 0.010 inch thick, most preferably about 0.005 inch thick. The ceramic layer 52 is preferably yttria-stabilized zirconia, which is zirconium oxide containing from about 2 to about 12 weight percent, most preferably from about 3 to about 8 weight percent, of yttrium oxide. It may be deposited by any operable technique, such as physical vapor deposition or thermal spray. Other operable ceramic materials may be used as well.

The present invention has been reduced to practice on test specimens. The chromide first coating is found to have good oxidation and good corrosion resistance.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A coated gas turbine component, comprising:
    a gas turbine component comprising a base metal, the gas turbine component including
        a platform,
        a shank extending downwardly from the platform, and
        an airfoil extending upwardly from the platform;
    a first coating contacting the base metal of at least a portion of the shank and interdiffused therewith, the first coating comprising a first chromide layer; and
    a second coating contacting at least a portion of the airfoil, the second coating comprising
        a protective layer selected from the group consisting of a diffusion coating and an overlay coating.

2. The component of claim 1, wherein the base metal has a composition, in weight percent, of from about 4 to about 20 percent cobalt, from about 1 to about 10 percent chromium, from about 5 to about 7 percent aluminum, from 0 to about 2 percent molybdenum, from about 3 to about 8 percent tungsten, from about 4 to about 12 percent tantalum, from 0 to about 2 percent titanium, from 0 to about 8 percent rhenium, from 0 to about 6 percent ruthenium, from 0 to about 1 percent niobium, from 0 to about 0.1 percent carbon, from 0 to about 0.01 percent boron, from 0 to about 0.1 percent yttrium, from 0 to about 1.5 percent hafnium, balance nickel and incidental impurities.

3. The component of claim 1, wherein the protective layer comprises a diffusion coating selected from the group consisting of a diffusion aluminide and a diffusion platinum aluminide.

4. The component of claim 1, wherein the protective layer comprises an MCrAlX overlay coating.

5. The component of claim 1, wherein the first chromide layer comprises an average of from about 20 to about 30 percent by weight of chromium.

6. The component of claim 1, wherein the first chromide layer has a thickness of from about 0.001 to about 0.002 inch.

7. The component of claim 1, wherein the protective layer contacts the base metal of the airfoil.

8. The component of claim 1, wherein the second coating further includes a second chromide layer disposed between the base metal of the airfoil and the protective layer, and interdiffused with the base metal of the airfoil.

9. The component of claim 8, wherein the second chromide layer comprises an average of from about 20 to about 30 percent by weight of chromium.

10. The component of claim 8, wherein the second chromide layer has a thickness of from about 0.001 to about 0.002 inch.

11. The component of claim 1, wherein the second coating further includes a ceramic layer overlying the protective layer.

12. The component of claim 1, wherein the gas turbine component is selected from the group consisting of a turbine blade and a turbine vane.

13. A coated gas turbine component, comprising:
    a gas turbine component comprising a base metal, the gas turbine component being selected from the group consisting of a turbine blade and a turbine vane and including
        a platform,
        a shank extending downwardly from the platform, and
        an airfoil extending upwardly from the platform;
    a first coating contacting the base metal of at least a portion of the shank and interdiffused therewith, the first coating comprising a first chromide layer comprising an average of from about 20 to about 30 weight percent chromium; and
    a second coating contacting at least a portion of the airfoil, the second coating comprising
        a second chromide layer contacting the base metal of the airfoil and interdiffused therewith, the second chromide layer comprising an average of from about 20 to about 30 weight percent chromium, and
        a protective layer overlying the second chromide layer and interdiffused therewith, the protective layer comprising a material selected from the group consisting of a diffusion aluminide and a diffusion platinum aluminide.

14. The component of claim 13, wherein the second coating further includes a ceramic layer overlying the protective layer.

15. A method for preparing a coated gas turbine component comprising a base metal, the method including the steps of furnishing a gas turbine component comprising a platform, a shank extending downwardly from the platform, and an airfoil extending upwardly from the platform;

first applying a first coating overlying the base metal of at least a portion of the shank and interdiffused therewith, the first coating comprising a first chromide layer; and second applying a second coating overlying at least a portion of the airfoil, the second coating comprising
a protective layer selected from the group consisting of a diffusion coating and an overlay coating.

16. The method of claim 15, wherein the step of first applying includes steps of depositing chromium overlying the base metal of the shank, and interdiffusing the chromium with the base metal.

17. The method of claim 15, wherein the first chromide layer comprises an average of from about 20 to about 30 weight percent chromium.

18. The method of claim 15, wherein the step of second applying includes the step of depositing the protective layer overlying the base metal of the airfoil.

19. The method of claim 15, wherein the step of second applying includes steps of depositing a second chromide layer overlying the base metal of the airfoil, and depositing the protective layer overlying the second chromide layer.

20. The method of claim 19, wherein the first chromide layer and the second chromide layer are deposited concurrently.

* * * * *